United States Patent [19]

Oswald

[11] Patent Number: 4,789,608
[45] Date of Patent: Dec. 6, 1988

[54] PRESSURE VENTING DEVICE
[75] Inventor: John A. Oswald, Baldwin, Md.
[73] Assignee: Saft America, Inc., Baldwin, Md.
[21] Appl. No.: 30,138
[22] Filed: Mar. 26, 1987
[51] Int. Cl.$^4$ .................. H01M 2/12; B65D 51/16
[52] U.S. Cl. ................................ 429/56; 215/253; 220/207; 220/367
[58] Field of Search .......... 429/53, 56; 222/397; 220/207, 268, 367; 215/253

[56] References Cited
U.S. PATENT DOCUMENTS

| | | | |
|---|---|---|---|
| 3,831,822 | 8/1974 | Zundel | 222/397 |
| 4,003,505 | 1/1977 | Hardt | 222/397 |
| 4,484,691 | 11/1984 | Lees | 429/56 X |
| 4,601,959 | 7/1986 | Romero | 429/53 X |
| 4,610,370 | 9/1986 | Patterson et al. | 429/56 X |

Primary Examiner—Brian E. Hearn
Assistant Examiner—Stephen J. Kalafut
Attorney, Agent, or Firm—Cushman, Darby & Cushman

[57] ABSTRACT

A pressure venting device for a battery casing includes two semi-circular concavities extending upwardly from the bottom surface of the casing, two oppositely disposed bridges interrupting the concavities and two weakening or score lines disposed laterally and offset from the bridges. Since the score lines are formed in a flat area of the bottom surface of the battery casing, venting will occur consistently at a predetermined pressure range.

6 Claims, 2 Drawing Sheets

FIG. 3
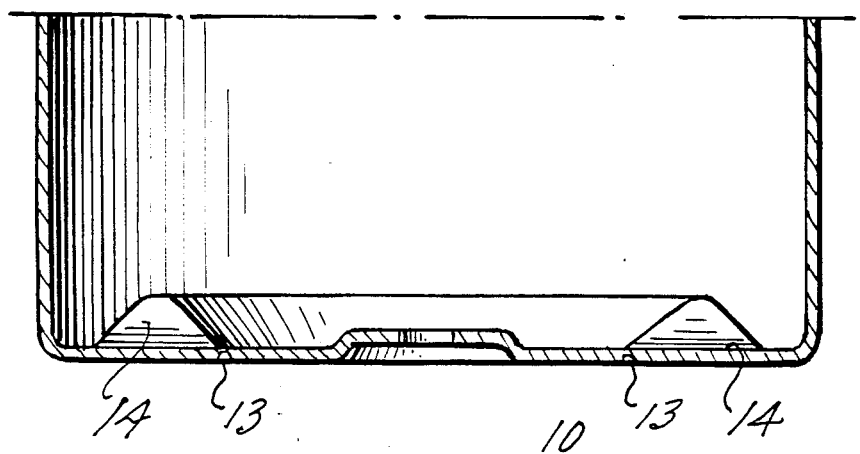
FIG. 4
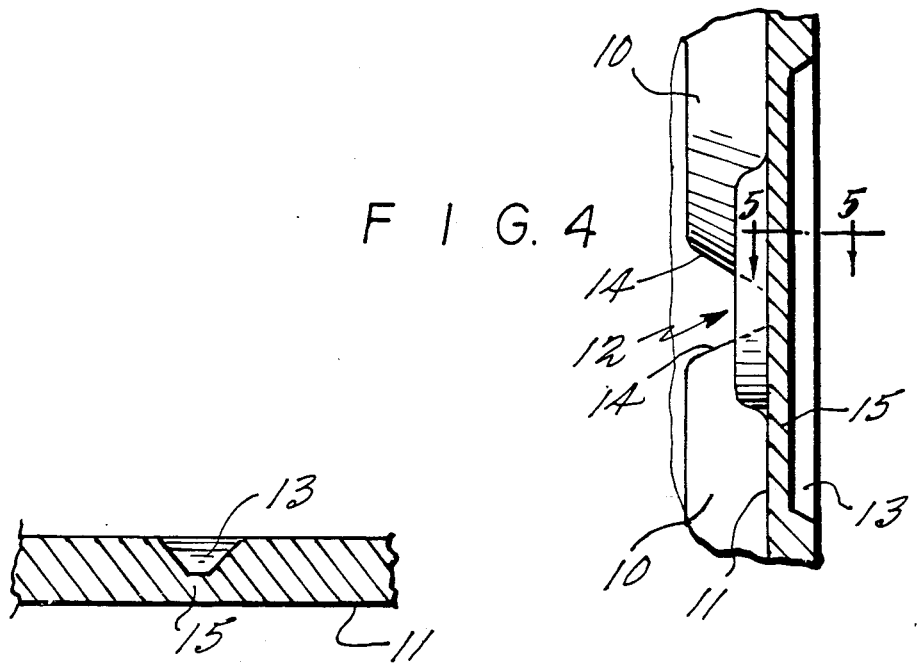
FIG. 5

PRESSURE VENTING DEVICE

FIELD OF THE INVENTION

The invention ss directed to a pressure venting device for a container and has special application for use in a battery case. More particularly, the invention is preferably used in the venting of lithium sulphur dioxide batteries.

BACKGROUND OF THE INVENTION

Containers which are used to encase pressurized components, such as for example battery cases, will require a pressure venting device formed in the container in order to vent any undesirable increase in internal pressure. By venting undesirable increases in internal pressure, the container is prevented from becoming a dangerous projectile, because of explosive forces resulting from the build up of excessive pressure within the container.

It has been proposed in U.S. Pat. No. 3,918,610 to Willis to place a pressure venting device in an aerosol can which encases pressurized contents. More particularly, Willis proposes that integral concavities be formed in the bottom of the container with integral hollow bridges interrupting the concavities and spanning opposing side walls thereof. A further key feature of this patent is the provision of a weakening line or score in the container wall transversely across the bridge.

A major drawback of the proposed Willis device is that during the manufacturing process the score is put into the container while it is flat, but as the concavities and bridges are formed the score becomes stretched by the forming, which results in an inconsistent score thickness. Thus, forming the bridges so as to have the scores extending transversely thereto, after scoring, causes the metal to thin out as it is being stretched around the form. Consequently, this thinning of the residual thickness of the scores causes erratic vent pressures.

SUMMARY OF THE INVENTION

The invention is a pressure venting device which is incorporated, preferably, in to the closed end (bottom) of a drawn, cylindrically shaped, to be hermetically sealed steel can. The purpose of the invention is to consistently vent any undesirable increase in internal pressure.

The invention comprises two arcuate concavities which are disposed around the peripheral area of the container. These concavities are joined by hollow bridges provided at opposite side walls of the concavities. As pressure increases in the container the bridges are placed under tensile strain. Simultaneously the concavities are placed under bending strain. Accordingly, the bridges are tending to stretch upward along with the center of the container, while the concavities are unfolding upwardly.

The concavities can be extended while the bridges are being subjected to a tensile strain beyond their rupture point. Under increasing pressure the center flat area of the bottom of the can also tends to move upward. This exerts a pulling force on both the bridges and the concavities.

In order to take advantage of this movement, score lines are placed in the inner most end of the bridges and which contact the outside edge of the center flat area of the can. The force produces small bending strains in the concavities concurrent with a large outward displacement of the flat center area, this force thereby increases the tensile strain in the bridges until the scores are eventually ruptured.

The invention will rupture because of the locations of the scores with respect to the deformed contours in the bottom of the can. These contours concentrate pressure and direct the pressure to pre-selected areas in the bottom face of the can, the locations of the scores taking advantage of this concentration of pressure.

The outer most diameter of the bottom face between the edge of the bridges and the wall of the container is subject to a compressive force. As the center of the container moves upward, the concavities are elevated slightly tending to compress the outer diameter of the container.

This compressive force plus the bridge's resistance to elongation, increase the forces acting on the center of the container. This diversion of pressure rapidly increases the plastic deformation of the center of the container.

Since the scores are placed in the flat area of the container and are maintained in the flat area, a constant residual thickness can be maintained in the scores after the formation of the container including the concavities and bridges. In this manner the pressure at which the container vents can be maintained within a constant range as compared to the varying vent pressures of the prior art containers.

BRIEF DESCRIPTION OF THE DRAWINGS

FIG. 3 is a cross sectional view of FIG. 1 along line 3—3;

FIG. 4 is a cross sectional view of FIG. 1 along line 4—4; and

FIG. 5 is a cross sectional view of FIG. 4 along line 5—5.

DETAILED DESCRIPTION OF THE INVENTION

Figure 1:
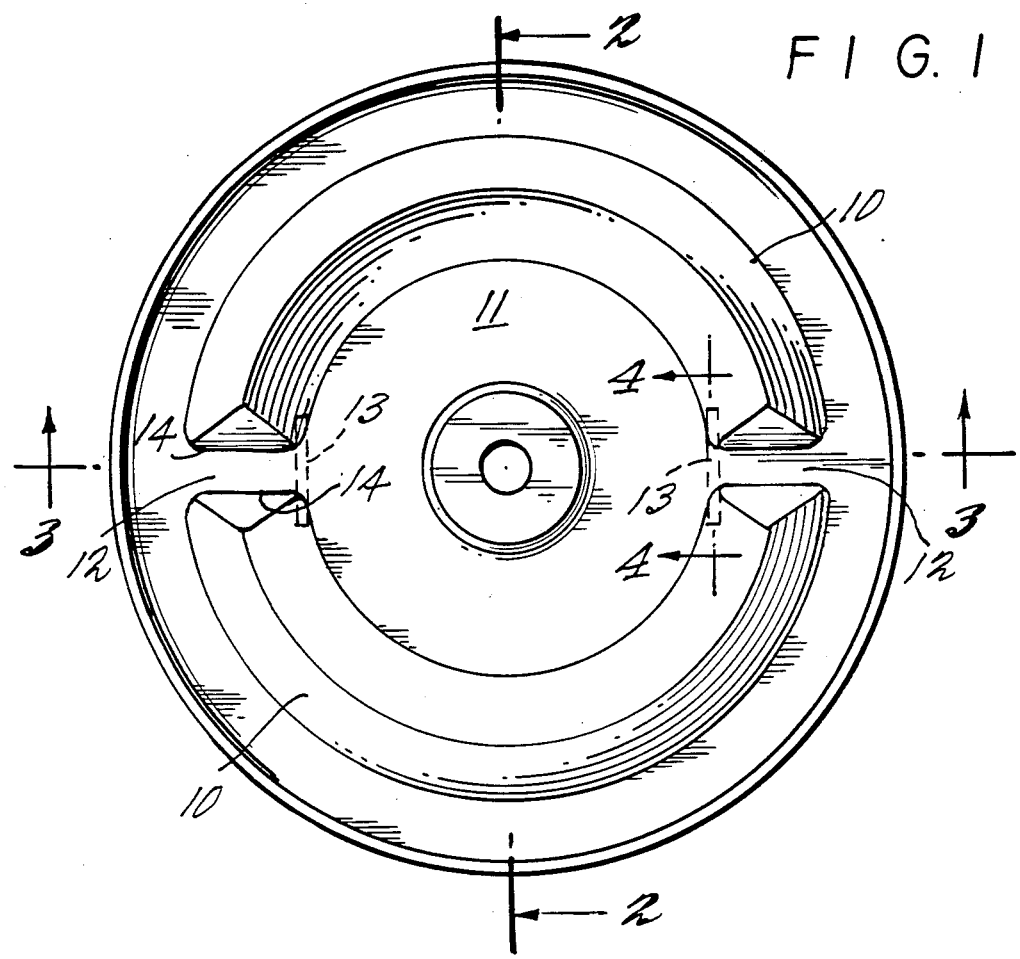
FIG. 1 is a top view looking down into the container with the top of the container removed, according to the invention.
Figure 2:
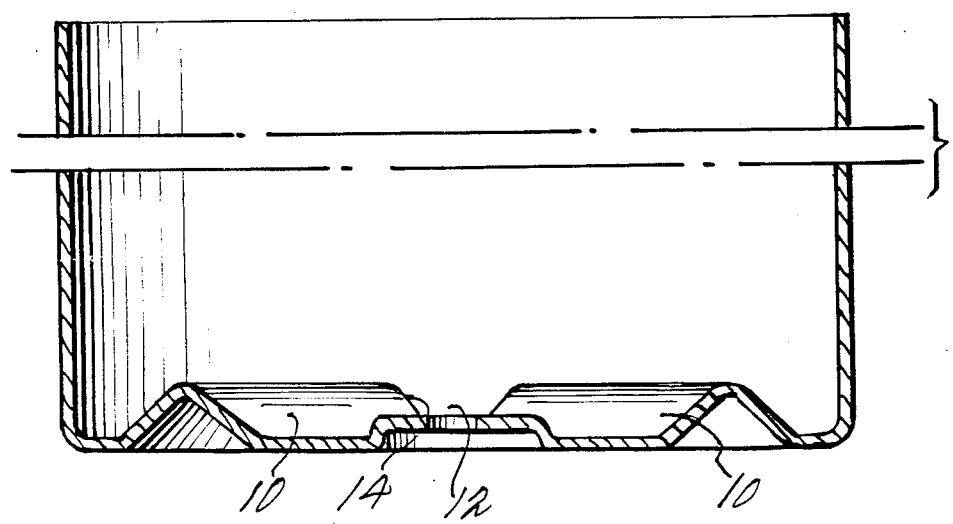
FIG. 2 is a cross sectional view of FIG. 1 along line 2—2.

FIG. 1 shows the bottom of a container in accordance with the present invention and FIGS. 2-5 are various cross-sectional views of the FIG. 1 container. More particularly, FIG. 1 is a view looking down into the container, with the top of the container removed. Reference numerals 10 depict arcuate concavities extending upwardly from the bottom surface 11 of the container, as can be seen in FIGS. 2-4. Bridges 12 are diametrically opposed and abut opposite side surfaces 14 of concavities 10. Score lines 13 are disposed in the flat central area of the container adjacent to the bridges 12, but offset therefrom.

The score lines are formed in the bottom of the container by, for example, use of chiselled shaped punches. This is accomplished during manufacturing by striking the material and compressing the area directly under the punches. The thickness of the material after "scoring" is called the residual. The score area is torn apart (ruptured) by the movement of the center of the can and the bridge effect, as has been described above. As more clearly shown in FIGS. 4 and 5 the score lines 13 are disposed in the outwardly facing bottom surface 11 of the container. The thickness of portion 15 is the residual thickness referred to above.

The vent pressure of the container is directly related to the residual thickness, as will be recognized by those skilled in the art. The thinner the residual, the lower will be the vent pressure. Typically, in a preferred embodiment of the invention the residual thickness will be on the order of 0.007 to 0.009 inches thick. At a residual thickness of 0.007 inches the vent pressure will be 420 PSIG±20, at 0.009 inches residual thickness the vent pressure will be 485 PSIG±20. The width of the score lines can vary depending upon the diameter of the can being processed.

When the score lines rupture and vent, they tear from the center towards the ends. As they tear there will be an abrupt discharge of pressure. After discharge, the vents will remain open and pressure can not again increase.

As noted above, there are two scores put into the face of the can in the preferred embodiment. They are diametrically opposed on a predetermined distance from the center of the can. The distance from the center of the can to the center of the score is strategically determined to take advantage of the internal acting forces, as will be recognized by those skilled in the art.

It should be appreciated that the above described description of the preferred embodiment does not limit the scope of the present invention in any way, and that various changes and modifications may be made without departing from the spirit and scope of the present invention.

What is claimed is:

1. A vent pressure device for a substantially cylindrical container, said device comprising:
    at least two arcuate concavities formed in one end of the container, said concavities extending upwardly into the interior of the container;
    at least two diametrically opposed bridges formed in the one end of the container which interrupt said at least two arcuate concavities; and
    at least two diametrically opposed score lines formed in the one end of the container, said score lines being disposed laterally and interiorly offset relative to each of said at least two bridges and being disposed to span across an area so as to contact two of said at least two arcuate concavities.

2. The device as in claim 1, wherein the residual thickness of said score lines is 0.007 inches.

3. The device as in claim 1, wherein the residual thickness of said score lines is 0.009 inches.

4. The device as in claim 1, wherein the container is made of sheet metal.

5. The device as in claim 1, comprising two arcuate concavities, two bridges and two score lines.

6. The device as in claim 1, wherein said score lines are disposed facing outwardly from the container.

* * * * *